May 22, 1934.  J. P. BURKE  1,959,612
APPARATUS FOR MANUFACTURING ARTICLES FROM PLASTIC COMPOSITION MATERIALS
Filed May 7, 1932  7 Sheets-Sheet 2
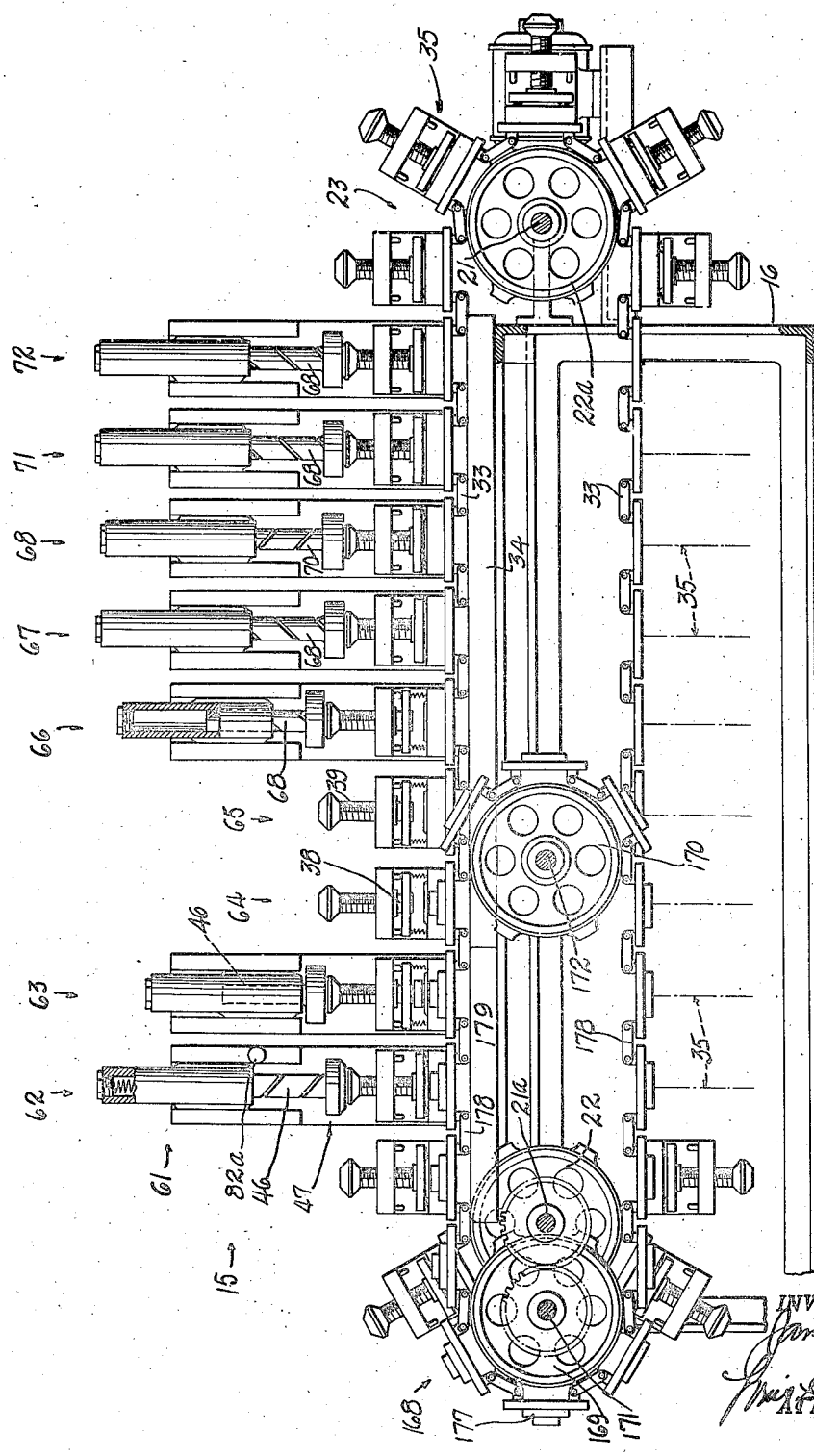

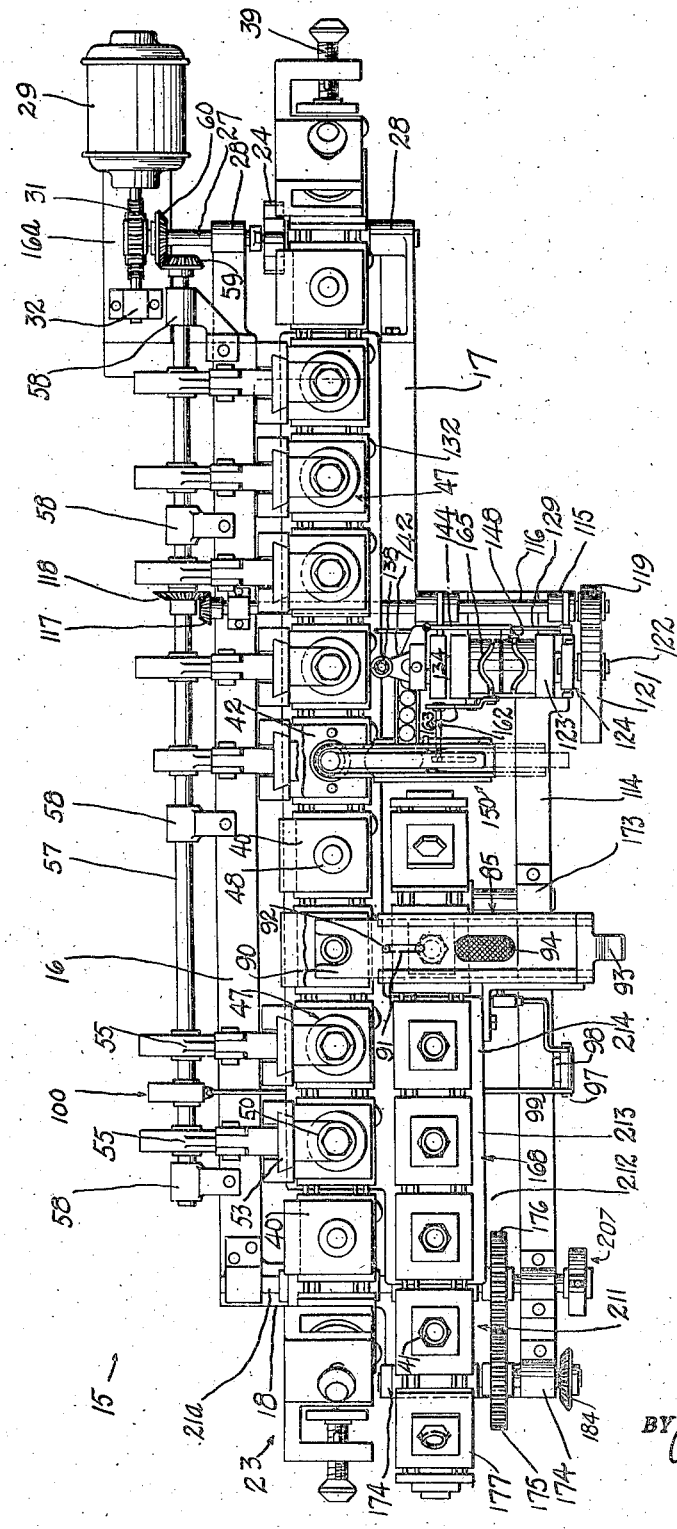

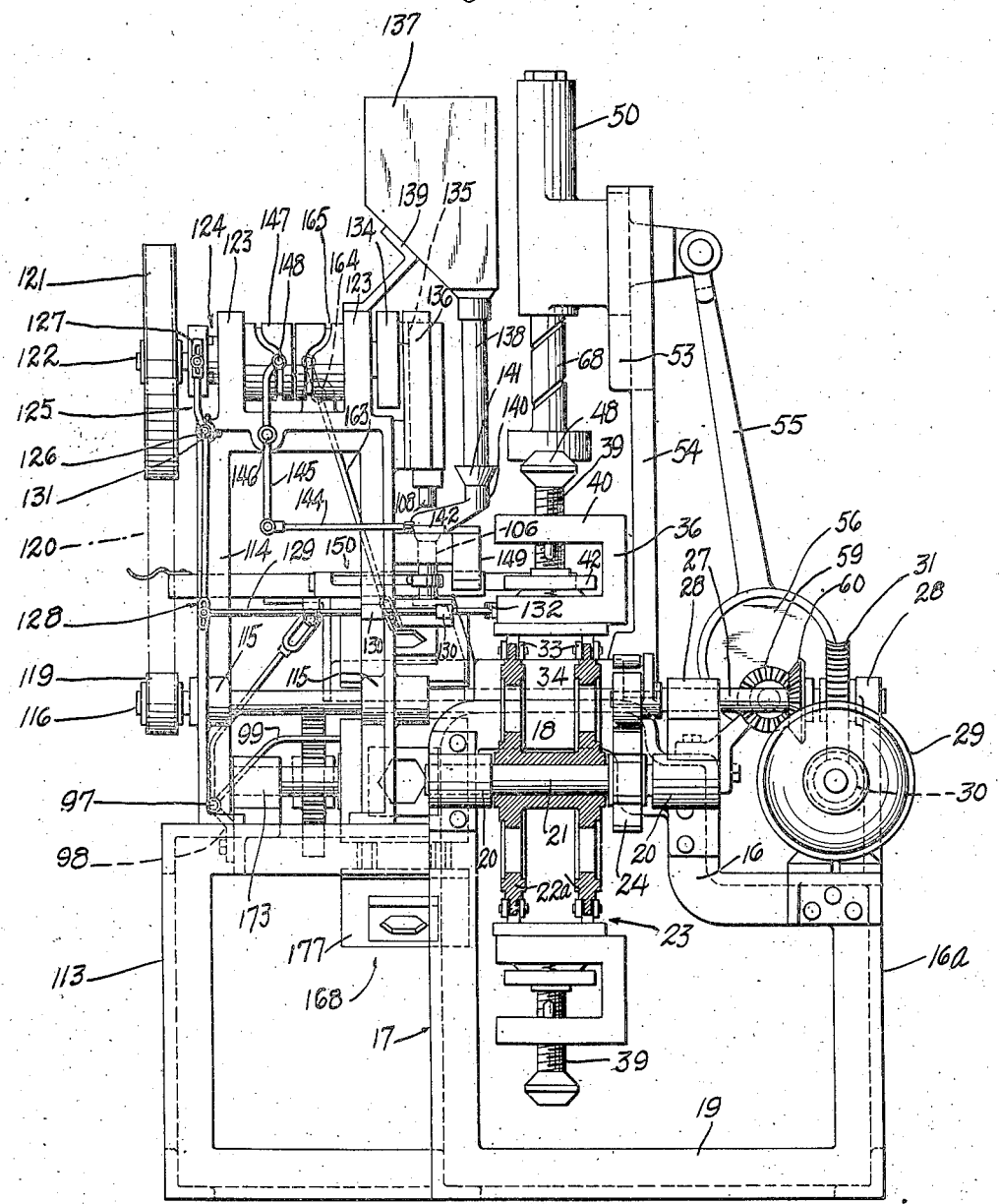

May 22, 1934.  J. P. BURKE  1,959,612
APPARATUS FOR MANUFACTURING ARTICLES FROM PLASTIC COMPOSITION MATERIALS
Filed May 7, 1932  7 Sheets-Sheet 4
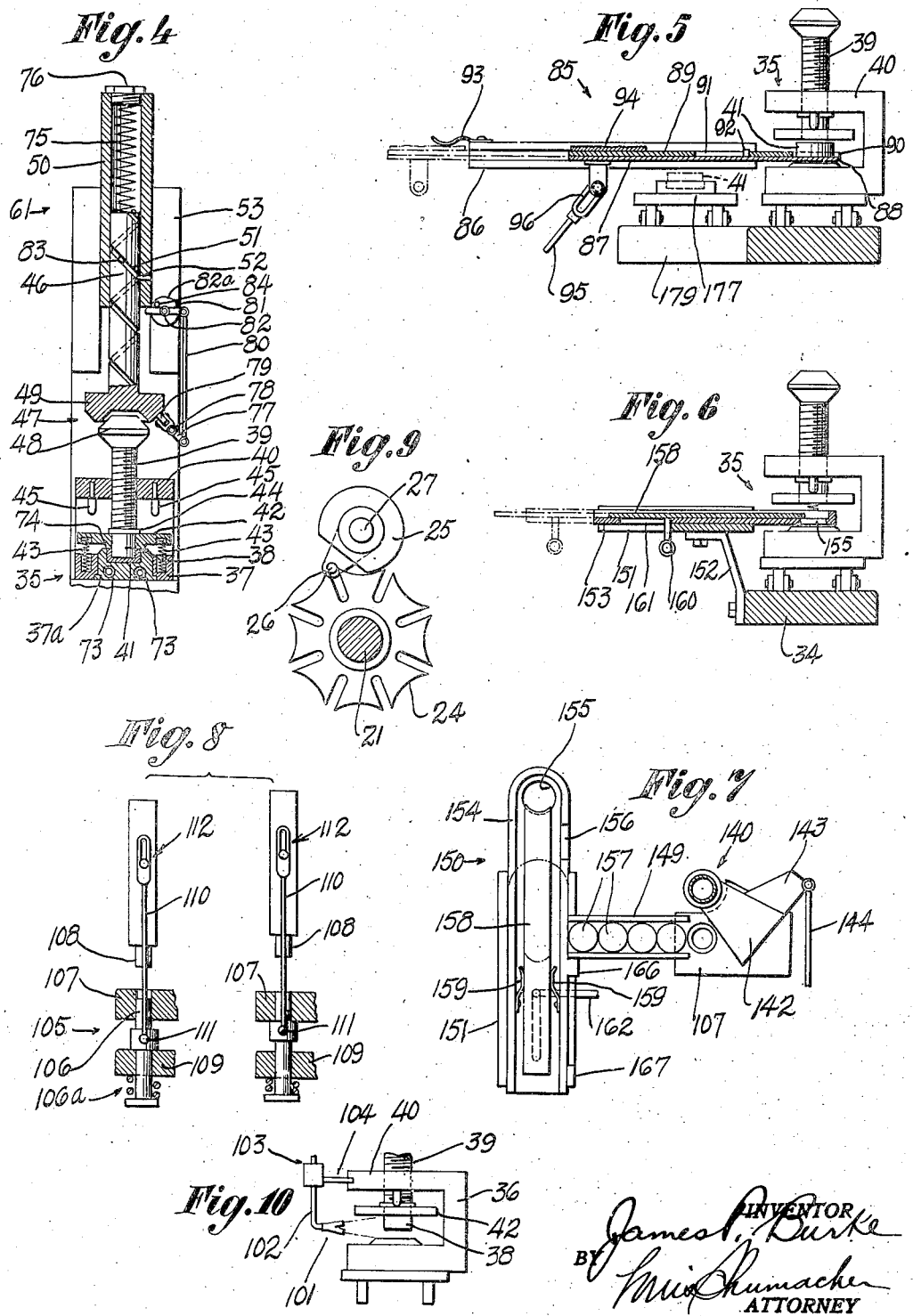

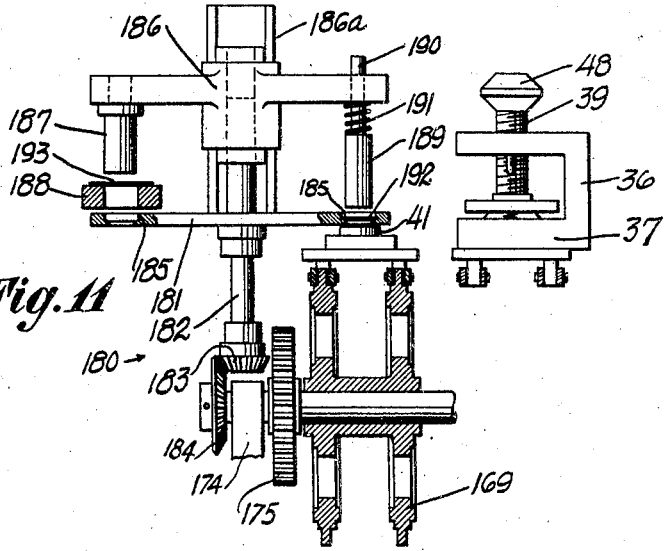
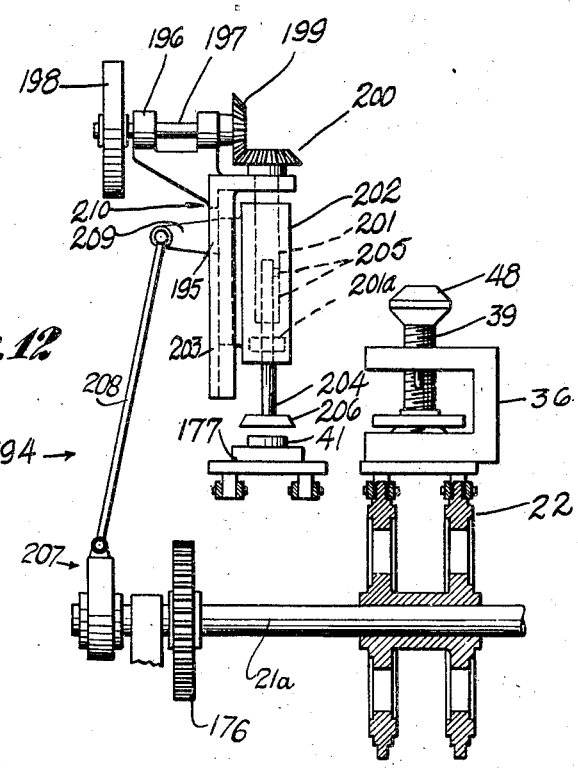

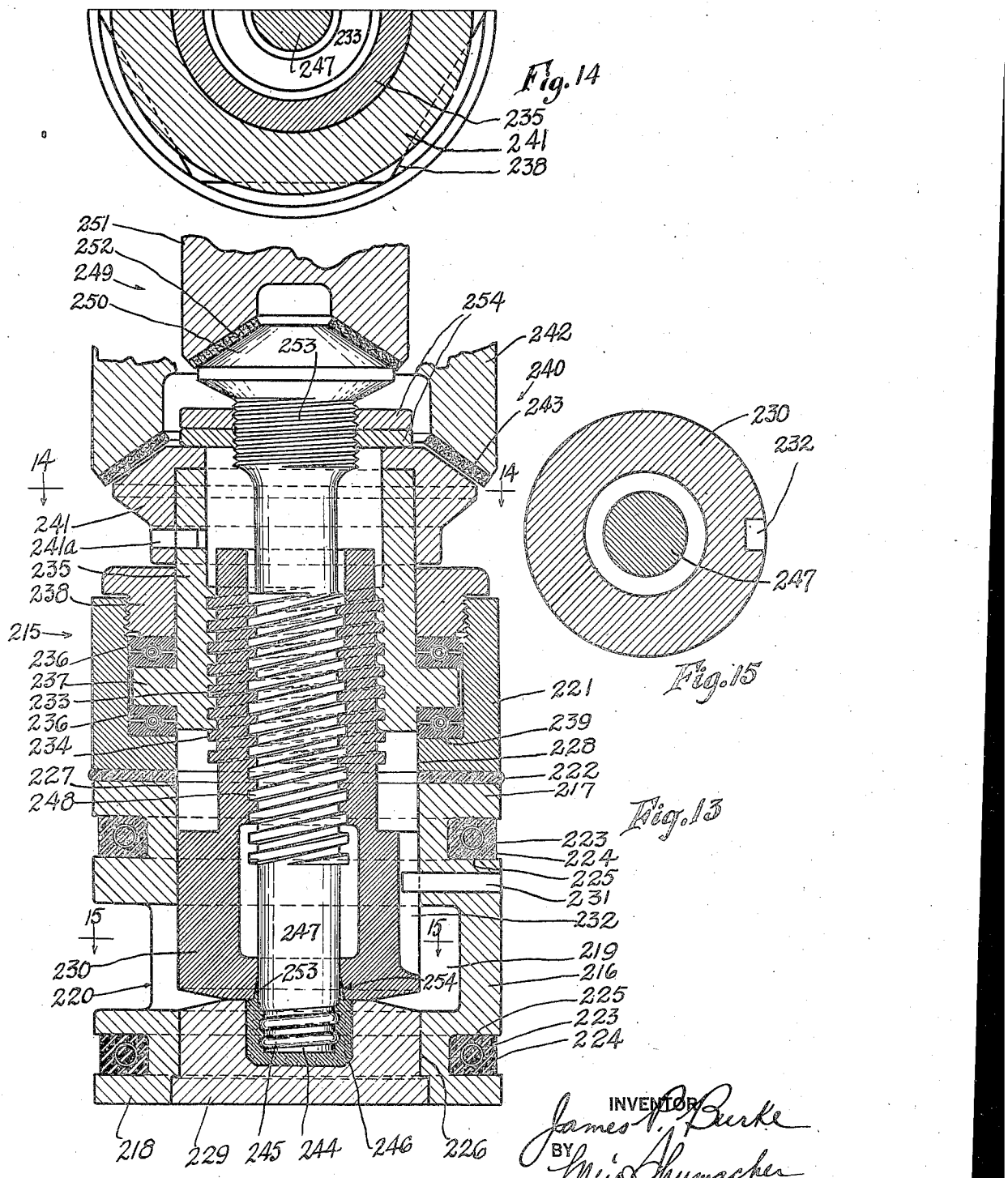

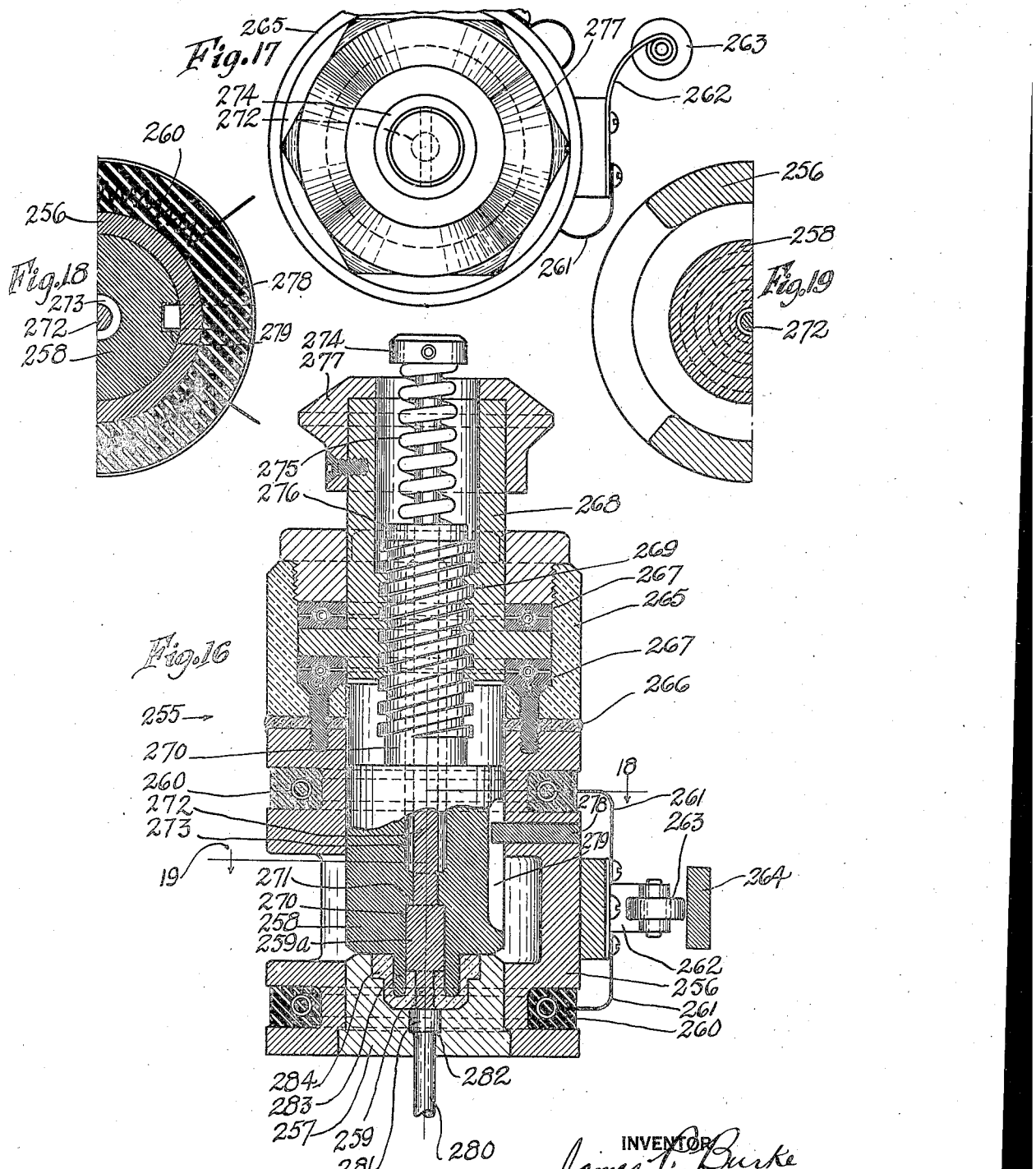

Patented May 22, 1934

1,959,612

UNITED STATES PATENT OFFICE 1,959,612

APPARATUS FOR MANUFACTURING ARTICLES FROM PLASTIC COMPOSITION MATERIALS

James P. Burke, Knoxville, Tenn., assignor to Auto-Mold, Inc., Knoxville, Tenn., a corporation of Delaware Application May 7, 1932, Serial No. 609,874

13 Claims. (Cl. 18—17)

This invention relates to apparatus and methods for the complete manufacture of molded articles.

One object of this invention is to provide an improved apparatus for the die molding of plastic compositions, including a traveling series of dies and associated means whereby the molding of articles occurs continuously in an automatic manner, and the articles produced having a high degree of accuracy and uniformity.

Another object of the invention is to furnish an apparatus for the die molding of compositions under heat and pressure, wherein improved means are provided in conjunction with a traveling series of dies for exerting increasing high pressures on the successive dies coincident with the travel thereof and as the molding and heating operations progress.

Another object of the invention is to construct an apparatus of the character described including improved means for the making of tablets or the like of composition materials to be fed to the die molds, while the molding operations are occurring.

Another object of the invention is to furnish an improved device in association with a series of dies whereby articles obtained from the different dies are continuously operated upon and different finishing operations performed.

Another object of the invention is the provision of an improved apparatus for the preliminary treatment of plastic compositions, molding thereof, and performance of the finishing operations, together with automatic feeding, compression and ejection of the articles in the different stages of operation, with the various operating mechanisms interrelated in a novel manner for a continuous, timed operation throughout.

Another object is to provide an apparatus of the nature set forth having relatively few and simple mechanisms, and which is economical, reliable, and efficient to a high degree in use.

A further object of the invention is to provide a novel process for the uniform molding of objects; also for the manufacture of articles of plastic compositions, by which the different articles are treated in regular comparatively quick succession to successively uniformly acquire the different characteristics that are to be impressed thereon.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Figure 1 is a top plan view of an apparatus embodying the invention.

Fig. 2 is a view in side elevation thereof, with the cleaning, ejecting and tablet making devices removed.

Fig. 3 is a view in end elevation thereof with parts in section.

Fig. 4 is an enlarged vertical sectional view of a die and operating means therefor.

Fig. 5 is a vertical sectional view of an ejecting means for the dies.

Fig. 6 is a vertical sectional view of means for feeding tablets to the dies.

Fig. 7 is a top plan view of the tablet forming and feeding means.

Fig. 8 are vertical sectional views of the tablet forming mold in initial and ejecting positions.

Fig. 9 is a detail of a Geneva drive connection for intermittent operation of the machine.

Fig. 10 is a view in elevation of a mold and cleaning means therefor.

Fig. 11 is a fragmentary view in vertical section of a device for inserting liners in caps, continuously with the production of the caps.

Fig. 12 is a view in elevation with parts in section of a device for the continuous performance of finishing operations on the caps.

Fig. 13 is a fragmentary view in vertical section of a modified die and actuating means.

Figs. 14 and 15 are transverse sectional views taken on lines 14—14 and 15—15 respectively of Fig. 13, Fig. 14 being a half section.

Fig. 16 is a vertical sectional view of a further modification of a mold and actuating means.

Fig. 17 is a top plan view thereof.

Figs. 18 and 19 are transverse half sections taken on lines 18 and 19 respectively of Fig. 16.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawings, therefore, is submitted merely as showing the preferred exemplification of the invention.

Generally described, this invention provides a series of endless traveling dies consisting of upper and lower mold parts which are constantly maintained as operative units in open and closed positions. Associated with these dies, if the same are devised for the molding of certain plastic compositions, such as synthetic resinous materials, may be a suitable heating means acting on the dies along a portion of their path of travel. The molding of these and similar plastic compositions occurs under high pressure, and according to my improved method, the pressures are gradually increased as the heating progresses. To accomplish this, the dies are caused to move intermittently, while powerful elements such as screw members positioned along a portion of the path of travel of the dies, are caused to move into and out of cooperation with the dies for increasing the compression on the dies successively. For maintaining the compression caused by the screw members, the dies are provided with individual pressure maintaining members, such as screws, intermittently actuated by the first mentioned screw members. Thus compression is gradually increased up to a suitable point and maintained until the treatment is completed. Each die mold is thus seen to embody therewith as a complete traveling unit a means for maintaining the same under compression, independently of any other means, whereby the travel of the dies can be accomplished easily and with a minimum of resistance, while a high compression range is afforded. If gases generated in course of the molding are to be bled, a release of compression may be effected, and a subsequent increase of compression, according to the principles above stated. The dies themselves may be of the positive, semipositive, or flash type, and can be variously arranged. Preferably the semipositive and flash type molds are employed, and means may be provided for causing an impact on the article in the mold in order to break the web thereof. Associated with the dies is a device for automatically charging plastic compositions into the dies. Such device may include means for pressing the composition into tablets of the proper mass and feeding the tablets into the dies synchronously with the intermittent travel of the dies. Another device may be provided for the automatic ejection of the molded articles and subsequent treatment thereof, which device may include a traveling series of holders for the articles and means disposed along the path of travel thereof for grinding, drilling, boring or lining the articles.

Referring in detail to the drawings, 15 denotes a device embodying the invention. The same may include a frame having a plurality of elongated parallel frames 16, 17 interconnected at the ends thereof by upper and lower cross bars 18, 19. At the ends of the frame, bearings 20 may be provided for shafts 21 on each of which may be secured double sprocket elements 22, 22a or the like, for carrying an endless chain 23 extending along the length of the frame. Any suitable means may be employed for causing a uniformly intermittent travel of the chain, such as a Geneva drive member 24 mounted on one of the shafts 21. The latter may be operated by a cam 25 and crank pin 26 fixed on a continuously rotating cross shaft 27 which may be journaled in bearings 28 mounted on the frame. Shaft 27 may be rotated by a motor 29 mounted on said frame members 16 and 16a and having a worm 30 for rotating a worm wheel 31 that is fixed on said shaft. The worm 30 may have a supporting bearing 32 adjacent to the end thereof.

A plurality of molds or dies may movably coact with the chain 23 or may constitute a part thereof. Thus said dies may be movably interconnected as by links 33 which may afford spaces between the dies for receiving the teeth of the sprockets. For supporting the dies intermediate of the sprockets, rails 34 may be provided along which the links may be slidable with the aid of lubricant or other antifriction means. A support may also be provided for the lower stretch of the chain, or the latter may hang from the sprockets and thereby assure a taut condition of the chain.

All of the dies or molds 35 may be exactly alike and may be of any suitable construction. Each of the dies may be formed of two or more parts and can be of the positive, semipositive or flash types. An essential principle in the construction of the dies is that they include individual means for maintaining them under compression, whereby they are freely movable along the machine without continuous dependence upon a separate compressing means. While a separate compressing means is provided, the same acts merely intermittently upon the dies at certain points of the path of travel thereof to exert compression thereon, and the dies then maintain their own compression while traveling between and beyond said points.

For illustrative purposes, die 35 may include a U shaped member 36, the lower arm 37 of which may have the mold cavity or lower die member 37a. The plunger or upper die member 38 may be mounted or journaled on a power applying member such as a screw 39, that may be threaded through the upper arm 40 in alinement with the mold cavity. By rotating screw 39, compression may be applied on the upper die member. To facilitate ejection of a molded article, such as a cap, from the dies, the plunger may be arranged to withdraw the cap from the cavity, as by making the plunger very slightly upwardly tapering. Hence when the plunger is raised, the cap 41 is withdrawn from the cavity. To strip the cap from the plunger, any suitable means may be used, such as a plate 42 having a central hole through which the plunger snugly extends. Expansion coil springs 43 tend normally to raise the stripper plate, the latter being stopped by a shoulder 44 on the plunger. The upper arm 40 may carry abutment pins 45 for the stripper plate. Consequently, as the plunger moves upwardly with the cap and stripper plate, the latter eventually strikes the abutment pins which arrest the travel of the stripper plate, while the plunger continues moving upward. Hence the cap is stripped from the plunger by said plate, to be discharged as hereinafter described. Then the cavity is loaded and the plunger and stripper plate descend, compressing springs 43.

Any desired means may be used for momentarily applying a force to the compression maintaining member 39. For example, a cam member or jack screw of large pitch may be employed as shown at 46. The same may be variously engageable with the compression maintaining screw 39, as by means of a clutch 47. Said clutch may include a clutch element 48 on screw 39 and a coaxial clutch element 49 on the cam compressor member 46. A simple means for actuating member 46 may comprise a hub or sleeve 50 for the same, and the member 46 may have a cam groove 51 engageable with an element such as a pin 52 secured to said sleeve. Rotation of member 46 and hence engagement of clutch 47 and rotation of screw 39 may be caused by axial movement of the sleeve 50. For example, the said sleeve may be movable along a guide member 53 formed on an arm 54 rigidly secured to the machine frame. For reciprocating the sleeve 50, a connecting rod 55 may be engaged with an eccentric 56 on a shaft 57 journaled in bearings 58 secured to frame member 16. Said shaft may be rotated by a bevel gear 59 engaged by a bevel gear 60 secured on motor driven shaft 27.

This invention contemplates the intermittent actuation of screws 39 for the purpose of obtaining the best molding action and according to the materials used and the conditions under which the molding progresses. To illustrate, a plurality of actuator units 61 may be spaced along a portion of the path of travel of the dies. Thus, the first unit 62 may operate to begin to open the dies, while the second unit 63 may complete the opening operation. These two units may be disposed for operation at successive steps in the movement of the dies. The cam members 46 of these units may turn counterclockwise. The numeral 63 may also denote the location at which a molded article is removed from the die. As hereinafter explained, at location 64, the dies may be cleaned, and at location 65 the dies may again be charged with molding material. No units 61 need be provided at 64, 65. At 66 is a unit which may be used to close the loaded die and apply an initial compression. At 67, a unit may be employed for applying additional compression. The units at 66, 67 may have their cam members 68 provided with grooves extending oppositely to those at 46 so as to turn clockwise. At 69 is a unit for reducing the pressure on the dies, as, for the purpose of permitting escape of gases or steam generated by heating the molding material in the die. This unit at 69 may have its cam member 70 provided with a groove sloping in the same direction as that of member 46 so as to turn counterclockwise when the unit is moved downward. At 71 and 72 are units for applying a successively increasing final pressure to the dies, the same having cam members 68.

All of the units at 62, 63, 66, 67, 68, 71 and 72 may be operated by the shaft 57 and connecting rods 55 coacting with cams such as 56. The cams 56 may be arranged at different angles for the different units, and may also be of different curvature with respect to each other, according to the desired timing, path of travel and speed of said units or any of them. In the case of each unit the power stroke may occur downwardly, whether the die is to be opened or closed, or compression applied or reduced. Said units constitute a series of power elements which are preferably relatively stationary and along which the dies are intermittently movable into successive coaction with the elements for receiving and storing power from the elements and maintaining compression while moving relative to the units or returning on the lower stretch of the chain.

Due to the increasing application of pressure at units 66, 67, gases generated as in the molding of synthetic resinous materials may gradually escape from the die before the final pressure is applied. In certain instances it may be advisable to momentarily release the pressure, especially in the molding of wet materials or compositions, the moisture of which may escape with difficulty, although in that case the step by step increase in pressure may be prolonged. The pressure at unit 72 may be considerably higher than at 67.

In general, it will be understood that any number of units may be used for a gradual intermittent application of pressure, with the increase in pressure being according to a graphic straight line of any desired slope or according to a curve whose slope may increase or decrease as the pressure increases.

The dies may be heated in any suitable manner as by causing them to travel through a suitably heated region, as is well understood in the art, or by applying a suitable heating medium directly to the dies, such as electrical heating coils 73. These coils may be connected in a suitable circuit for supplying current thereto during the travel of the dies. In this manner the dies may be heated to different temperatures as may be desired.

The mold shown in Fig. 4 may be of the flash type, the cavity being closed by a lip or shoulder 74 on the stripper plate 40. A slight fin generally forms on the rim of the cap 41, between the die 37a and shoulder 74. If it be desired to break the fin, an impact may be applied to member 46 as the same begins to rotate screw 39 for opening the die. Hence the unit at 62 may have means for causing an accelerated action of member 46. For example, an expansion coil spring 75 may act between an end of member 46 and an abutment such as a plug 76 fixed to the sleeve 50. In its descent, the member 46 may be momentarily stopped and then released for actuation by the spring. Thus a lever 77 having a fixed pivot 78 may carry a roller 79 adapted to ride along an inclined annular surface of the clutch head 49 at such an angle as to stop downward movement of member 46. A link 80 may connect the lever with a second lever 81 having a fixed pivot 82 on leg 82a and arranged to be engaged at its free end by sleeve 50. Downward movement of the sleeve 50 continues after the member 46 is arrested, the sleeve subsequently striking the lever 81 and tripping lever 77 from dead center position so that the member 46 is suddenly caused to descend and engage clutch head 48 with an impact, breaking the fin. Downward movement of member 46 relative to sleeve 50 may be stopped by an abutment 83 in cam groove 51, and when the sleeve 50 ascends, the stop lever 77 and associated parts may return to initial position shown by the action of gravity, until stopped by a pin at 84.

While all the compressor units may have cam elements generally similar to that shown for the unit at 62, the other units need not be provided with means for causing an impact engagement of the clutch such as 47. All units may have stops such as 84 so that cam members such as 68 and 70 and 46 of unit at 63 can be raised to clear the screws 39.

For automatically ejecting the molded articles from the dies, as at location 64, a means 85 may be provided as shown in Figs. 1 and 5. The same may include a suitable support 86 at a side of the dies and extending transversely thereto. Along this guide an elongated plate 87 may be slidable so as to have its end portion 88 projectible between upper and lower die members. Slidably supported on carrier plate 87 is an ejector plate 89 having a bifurcated end portion 90 for receiving a molded article resting on the carrier plate. For limiting the relative movements between plates 87, 89, the latter may have a slot 91 for receiving a pin 92 fixed to plate 87. The support 86 may carry a retaining element or friction shoe 93 engageable with ejector plate 89, as by means of a rough friction plate 94 secured thereon. Any suitable means may be provided for reciprocating carrier plate 87, such as a link 95 having lost motion pivotal connection at 96 with said plate. Link 95 may be offset and connected to a rock shaft 97 journaled in a bracket 98, and having an arm 99 joining the same with a cam at 100 on shaft 57, so that as the shaft rotates the carrier plate 87 is reciprocated. In operation, an article such as 41 is stripped from the upper die member after the ejecting means has advanced between the die members to receive the article. Then the plate 87 is retracted carrying with it the plate 89. When the article 41 is in substantial alinement with a suitable receiver beneath the ejector, as hereinafter described, the ejector plate portion 94 strikes the shoe 93 and is arrested in its movement. The retraction of carrier plate 87 continues until the article 41 is dropped into the receiver, assuming, for instance, the dotted line position shown in Fig. 5. The pin 92 may now be at the rear end of the slot 91 and forcibly retracts the ejector plate 89 due to the continued retraction of plate 87, until member 94 is frictionally engaged beneath resilient shoe 93. When the next intermittent motion of the machine occurs, the carrier plate 87 is advanced while the ejector plate is retarded by shoe 93, until pin 92 engages the forward end of the slot 91, so that the end portion 88 of the carrier plate is advanced relatively to the ejector plate 89. As the carrier plate 87 is further projected, the ejector plate is withdrawn from the shoe 93, and both plates 87, 89 advance as a unit between the upper and lower die members of a succeeding mold, for receiving an article stripped from the plunger. It is thus seen that the ejecting means 85 operates synchronously with the movement of the dies and is movable into and out of the path of travel of the dies.

After a molded article has been removed from the die, the same may be cleaned in any suitable manner in the position at 65. For instance, as shown in Fig. 10, a high pressure fluid or air jet may be used, the air being discharged through a nozzle 101 having a double outlet for discharging air on upper and lower die members. Said nozzle may be connected to a tube 102 having a valve 103, provided with an arm 104 that is suitably movable for automatically closing the valve, and which is movable by an element 40 of member 36 for opening the valve when the nozzle comes adjacent to the die members. Air under pressure may be supplied to the nozzle from a suitable source, and the upper and lower die members thoroughly cleaned. If desired, a plurality of nozzles 101 may be employed, angularly spaced with respect to the axis of the die members. The means 85 may be located at 64.

Means of any suitable character may be provided for automatically loading the dies. Said means may preferably accurately measure the individual charges, and may also compact or form the same into bodies such as tablets which are thus easier to insert into the molds and assure of uniformity in the feeding. Thus a die 105 may be provided as shown in Fig. 8, having a lower ejecting die member 106, an intermediate die member 107 and an upper die member or plunger 108. The intermediate die member may be relatively stationary and the upper and lower die members may be movable in alinement therewith. Thus the lower die member may be stopped and guided in a fixed member 109. A link 110 may be connected to the lower die member at 111 and to the upper die member with a lost motion connection at 112. Now, if the die member 108 is raised, after a tablet has been compressed, it will move upward into spaced relation to member 107 and then move the die member 106 against the force of expansion coil spring 106a to eject the tablet.

Any suitable operating means may be associated with the tablet forming dies, as shown, for instance, in Fig. 3. Thus a frame 113 may be provided, carrying at one end thereof, frame member 114. The latter may have a plurality of alined bearings 115 for a cross shaft 116 which may be rotated from shaft 57 as by intermeshing bevel gears 117, 118. Secured on shaft 116 is a pulley 119 which may be connected by a belt 120 with a pulley 121 mounted on a cross shaft 122. The latter may be journaled in bearings 123 of the frame member 114, and in order to obtain an intermittent rotation, the shaft may be split and provided with a clutch 124. The latter may be intermittently opened and closed by a lever 125 pivoted at 126 and having lost motion connection at 127 with the clutch and at 128 with a bar 129 slidably mounted in lugs 130. Said lever 125 is urged counterclockwise into clutch opening position by a coil spring 131 at pivot 126, and bar 129 is movable to close the switch by cams 132 fixed to and traveling with dies 35. Cams 132 may be of any desired size according to the required timing. Shaft 122 may carry at an end thereof a cam 134 engaged with the upper die member 108 at 135 for reciprocating the latter along a vertical guide 136 fixed to frame 114.

For automatically charging the tablet forming die 105, a bin 137 may be provided for handling the molding material in plastic, or powdered form and causing a constant feed thereof through a pipe 138. The bin may be mounted in stationary relation to frame 114 by a bracket 139, and the pipe 138 may be fixed to the bin. For intermittently feeding the molding material to the die, a secondary hopper or tube 140 is swiveled at 141 on the pipe 138 for oscillatory movement about the axis of said pipe, the tube 140 having an offset enlarged lower discharge portion 142 slidable in an arcuate path along the upper surface of die member 107. For oscillating the member 142, the same may have an arm 143 connected by a link 144 to a lever 145 pivoted on frame 14 at 146 and movable to and fro by a cam 147 in the groove of which the lever is engaged at 148. When the member 142 is in alinement with the tablet forming cavity, molding powder is discharged thereinto, after which said member moves laterally to the position shown in Fig. 7 with the upper surface of die member 107 affording a bottom closure for the discharge member. Now the plunger 108 is free to descend and compress the powder into a tablet. Upon the next oscillation of member 142, the die members being in open position shown in Fig. 8, the member 142 moves the ejected tablet laterally along a suitable inclined guideway or chute 149 and discharges a fresh charge of molding material into the die. From the chute 149, the tablets are fed to the article forming dies 35 by a feeding means 150 shown in Figs. 1, 6 and 7.

The tablet feeding means 150 may include a support 151 secured to support 34 by a bracket 152. Slidably guided on said support for reciprocation is a plate 153 which may have a marginal flange 154 extending along the sides and an end thereof, and having a bottom opening 155 at said end. The flange 154 may constitute a transverse closure for the lower end of the chute 149 in the projected position of plate 153, and said flange may have an opening 156 spaced from the end of the plate and adapted to communicate with the chute 149 for receiving a tablet 157 therefrom. In order that only one tablet at a time shall be so received the width of the receiving space in the plate 153 is so limited that, after one tablet is received, it prevents other tablets from entering until the received tablet is removed. Slidably disposed in the trough of plate 153 is a tablet discharging element 158 of elongated form adapted to move the tablet so as to cause the same to fall through opening 155. The element 158 may be frictionally engaged relative to plate 153, as by resilient members 159 secured to flanges 154 and bearing on opposite edges of the element 158. For moving the latter, a lug 160 may be downwardly extended therefrom through a slot 161. Extending laterally from the lug is a bar 162 connected to a lever 163 pivoted at 164 and engaging in a cam groove 165 intermittently rotated by shaft 122 for oscillating the lever.

In the operation of discharging means, plate 158 is retracted, causing retraction of carrier plate 153 by means of the springs 159 until the carrier plate is stopped by a lug 166 thereof striking an abutment 167 on support 151. The opening 156 is then in registry with chute 149, but entry of a tablet is prevented by element 158. The retraction of the latter is continued, with lug 160 moving along slot 161, and the tablet enters, whereupon projection of the slide 158 is begun and with it the carrier 153 is movable as a unit due to frictional engagement at 159. When the stop lug 166 strikes an abutment such as chute 149 the forward movement of the carrier is arrested, with opening 155 being in alinement with a die 35. The forward movement of the slide ejector 158 however continues, lug 160 moving to the forward end of the slot 161, until the slide moves the tablet into registry with opening 155 whereupon the tablet is discharged into the die cavity. It is thus seen that discharging means 150 moves intermittently into and out of the path of the dies 35 synchronously with the travel thereof.

In order to automatically receive the molded articles and perform various finishing operations thereon a series of elements may be provided traveling with or relatively to the chain of dies 35. For example, a secondary endless chain 168 may be provided for receiving the molded articles and intermittently advancing the same relative to apparatus for acting on the articles. Said chain 168 may be movably carried by sprocket wheels 169, 170 mounted on shafts 171, 172 respectively. Shaft 172 may be journaled in bearings 173 mounted on frame 114, and shaft 171 may be journaled in similar bearings 174 mounted on said frame. Secured on shaft 171 is a gear 175 which is engaged by a gear 176 fixed on shaft 21a carrying chain 23. Hence the chain 168 is caused to travel intermittently synchronously with the molding dies and in opposite direction relative thereto.

The chain 168 may include a series of article carriers or holders 177 having cavities, for instance, of the proper conformation to properly hold the molded articles 41, preferably without permitting rotation thereof. Hence the articles may be of angular form and the cavities may be of corresponding conformation. The holders 177 may be suitably interconnected as by links 178 for engaging around the sprockets and the teeth thereof. As shown in Fig. 5, the holders 177 may be suitably movable along an extension 179 of the support 34, and underneath the ejecting means 85, so that each holder successively receives a molded article. The chain 168 travels counterclockwise and when a holder moves downwardly along sprocket 169 the completed article may be automatically discharged due to its own weight.

Any desired instrumentalities may be provided for acting upon the molded articles. Thus, as shown in Fig. 11, means 180 may be provided for inserting a liner into a closure cap 41 of the conventional type. Said means may include a table 181 carried by a suitably mounted vertical shaft 182. The latter may be intermittently rotated as by a bevel gear 183 engaged with a bevel gear 184 that may be driven from any suitable or central power source, such as a shaft 171. Said table may have a circular series of openings 185 each of which may have an annular supporting shoulder therein. Said openings are adapted to successively aline with an article 41 carried by a holder 177. Reciprocably mounted in alinement with the shaft 182 is a cross head 186 movable along a vertical guide 186a by any suitable power means. Said cross head may extend in diametric relation over the table, and at one end thereof may have a male die member 187 cooperating with a stationary female die member 188. At its other end the cross head may carry a plunger 189 movably mounted thereon, and resiliently actuated by an expansion coil spring 191.

In operation, the lining means 180 is adapted to blank out the liners 192. For this purpose, a strip of material 193, such as metal fiber or composition, is intermittently fed in a suitable manner over the die member 188. When the cross head 186 descends, a liner 192 is blanked out and moved into opening 185. When this opening is in registry with article 41, plunger 189 descends and forces the liner past the shoulder in opening 185 and into the closure cap 41 where it may be seated as a thin disc against the end wall of the cap to form a tight seal or gasket for a bottle or other container to which the cap may be applied. Thus it will be seen that every time the crosshead descends a liner is blanked out and another liner inserted, and that this operation occurs synchronously with the intermittent production of the caps.

In Fig. 12 is shown a means 194 that may be used for grinding, drilling or counterboring a molded article. For example, a suitably supported frame 195 is provided having bearings 196 in which is journaled a shaft 197 carrying a pulley 198 and a bevel gear 199. The latter may engage a bevel gear 200 connected to a shaft 201 rotatable in a sleeve 202 which may be vertically slidable along a guide portion 203 of the frame 195. Shaft 201 may be hollow to receive a spindle 204 which is vertically slidable therein by engagement with the sleeve 202 at a bearing 201a, but which may be prevented from rotating relatively to 201 as by a conventional pin and keyway engagement at 205. At the end of the spindle 204, any desired tool such as a grinding element 206 may be detachably interchangeably secured in a well known manner. Said tool may remove any burr on the cap 41 or otherwise finish the same. In order to bring the tool into engagement with the molded article carried by holder 177, the sleeve 201 may be automatically reciprocated by a cam means 207 that may be mounted on shaft 21a, for example, or any other member turning in synchronism therewith, said cam means being connected by a link 208 with an arm 209 extending from sleeve 202 through a slot 210 in the guide 203.

Devices 180, 194 may be located for operating with holders 177 at any suitable locations, as at 211, 212 respectively. Other devices may be employed to operate on the molded articles at positions 213, 214, and driven synchronously intermittently as above stated.

In Figs. 13 to 15 is shown a modified die and associated operating means constructed as a unit 215. This unit may be embodied in the machine 15, or in any other kind of machine whether automatic or otherwise, and may also function as an independent unit. The mold shown may function as a semipositive or flash type mold, but the principles of the device may be employed in molds of widely varying types. One principle of the device may be characterized as including an improved means, including preferably concentric elements for individual actuation of a core and sealing member for a female die member.

The unit 215 may include a lower body or frame 216 of generally U shape and having upper and lower arms 217 and 218 which may be interconnected by side walls 219, if desired, and arranged to afford an opening 220. Superimposed upon the frame member 216 is a frame section or housing 221 which may be secured to the former in any suitable stationary manner (not shown). Between members 216 and 217 may be interposed insulation 222 for preventing transfer of heat generated by electrical heating coils 223 to member 221. Said heating coils may be mounted on member 216 in any suitable manner, as by being encased in insulation 224 and arranged to be mounted for easy replacement in external grooves 225. Members 216, 221 may have alined openings 226, 227, 228 of equal size. In opening 226, a female die member 229 is mounted and secured to the arm 218, so as to be heated by the coils 223. In opening 227, a sealing member 230 for the die member 229 is reciprocably guided, and nonrotatably engaged with member 216 by a pin 231 engaged in keyway 232 of the sealing member. Said sealing member, which is in alinement with the female die 229 extends upward through opening 228 in spaced relation to the walls thereof, as by having its upper portion 233 of reduced diameter. The portion 233 may have a large external thread 234 having screw engagement with a sleeve 235 which may be rotatably engaged with member 221, as by alined bearings 236 engaging on upper and lower sides of a shoulder 237 and retained by a bushing 238 threadedly connected to member 221 so that the bearings are held between said bushing and a shoulder 239 of the member. Any suitable connection may be utilized for rotating the sleeve 235. Thus a clutch 240 may be used, having a clutch member 241 of frustoconical ring form secured at 241a to an upper end of the sleeve. A rotary companion clutch head 242 of ring or sleeve form may be engageable with clutch member 241, and may have a frustoconical frictional lining 243 for that purpose.

Co-operating with the female die member 229 and the sealing member 230, a core member 244 may be provided. The latter may be variously formed and mounted. For illustrative purposes, the core member may have a thread 245 if the article or closure cap 246 is to be formed with an internal attaching thread for a container. Said core member is preferably formed as the lower end portion of a plunger 247 alined with the female die, and the sealing member 230 being hollow or arranged in the form of a sleeve through which the plunger may extend beyond the upper end of the sealing member. The latter and plunger 247 may have a running thread connection at 248 whereby a positive interrelative movement can be obtained therebetween. At its upper end the plunger may have a suitable power connection such as a clutch 249 for rotating the same. Thus the plunger may have a frustoconical clutch element 250, engageable with an alined rotary clutch element 251 having a corresponding frictional portion 252 for engaging the element 250. In order to positively adjustably limit downward movement of the core 244, the plunger may have a threaded portion 253 provided with lock nuts 254 adapted to move into seating engagement with the upper end of clutch element 241.

In operation, after the female die has been charged with molding material, the clutch 240 may be engaged to cause downward movement of the sealing member 230 into coaction with the female die 229. Then the clutch 249 may be engaged to cause the core 244 to move into operative relation with the female die to form the cap 246. The latter is suitably compressed, while heat is applied to the parts of the die by coils 223. In molding the article, a fin 253 may be formed thereon by providing a slight annular recess 254 in the lower part of the sealing member. After the welding is completed, clutch head 251 may be raised, and clutch 240 turned counter-clockwise to raise the sealing member 230, the latter carrying the core member 244 upward with it. Thus the cap 246 will be raised from the die member 229, and an ejecting means as hereinbefore described may move beneath the cap to receive the same. For disengaging the cap from the core 244, the clutch 249 may now be operated to raise the core 244 while the sealing member is stationary. Since the cap abuts the sealing member, the core is thus readily freed and removed, and the cap drops upon the ejecting means. However, it is also possible first to remove the core 244 by operation of clutch 249 while the sealing member 230 is stationary engagement with the female die member, and then to operate clutch 240 to elevate the sealing member, to which the cap may continue attached by fin 253 until engaged by the said ejecting means which may serve to break the fin in any suitable manner.

An alternative operation of the unit 251 may consist in first moving the core 244 into the charged female die and thereafter moving the sealing member 230 downward into cooperation therewith. The opening of the die may occur as hereinbefore stated, but, by providing the threads 234 and 248 of equal pitch, and the thread 234 being left hand while thread 248 is right hand, it is possible if the clutches are actuated in a correshanding manner, to move both clutches 240, 249 in the same direction in which case clutch 240 would perform the useful work while clutch 249 would operate as a follower or idler. Then a relative movement could be caused between members 244 and 230 in any suitable manner.

It will be readily appreciated that the unit 215 may be used in the machine 15, as by using a plurality of said units to form the chain 23, and providing suitable elements such as a plurality of cam members 46 for each unit 215 to operate the individual clutches 240 and 249. Or any suitable conventional drive may be used to operate the said clutches.

In Figs. 16 to 19 is shown a mold unit 255 which may be generally similar to unit 215, but having certain improvements incorporated therein. This unit may include a frame or housing 256 carrying a female die member 257 adapted to be sealed by a member 258 and to receive any suitable core 259. Associated with the die parts are one or more annular heating coils 260 which may be interconnected by leads 261 with a terminal 262 carrying a contact roller 263 for electrical engagement with a charged rail 264 that may extend along the path of movement of the molding dies in machine 15. Connected upon housing 256 is a secondary housing 265 insulated by insulation 266 and having bearings 267 for a sleeve 268 having threaded engagement at 269 with a hollow shaft 270 connected in alined relation with the sealing member 258 that is guided in housing 256. The core 259 may have a portion 259a slidably guided in opening 270 of the sealing member, and may be adapted to seat on a shoulder 271. Connected to the guide and motion limiting portion 259a is a rod 272 which may extend upward through an axial bore 273 of the members 258 and 270. To the upper end of said rod, a head 274 may be connected, and an expansion coil spring 275 may be disposed between said head and an antifriction member 276 resting on the upper end of the screw member 270. It is thus seen that the sealing member may be moved downward, as by suitably rotating the sleeve 268, a result that may be effected by means of a clutch, one element 277 of which is mounted on said sleeve, and the screw member being nonrotatably maintained as by a pin and keyway engagement 278, 279. While the core element 259 is movable with the sealing member, it may also be movable relatively thereto, in a downward direction, for removal of the cap and discharge thereof onto an ejecting means. In the event that the molded article should stick in the female die, an ejector element such as 280 may be movable upward through the bottom of said die to eject the article. As shown, the ejector element may have a head 281 forming a part of the bottom wall of the die and seated on a shoulder 282. Said ejector element may be moved upward by any suitable means, not shown.

It will be perceived that the sealing element may also constitute a core or a part thereof, as by having a projecting portion such as an annular flange 283 which may be spaced around the core 259. It will be understood that either or both core elements may be used.

In operation, after the female mold is loaded, the clutch head 277 is turned to rotate the sleeve and move the sealing member 258 downward, carrying with it the core 259. When the molding operation is completed, the sealing member and core are raised, the ejecting element 280 moving upward therewith at a suitable time interval thereafter. Then an ejecting or carrier means such as shown in Fig. 5 moves into position below the cap. Finally, the head 274 is struck to release the cap 284 from the flange 283 and, as the core 259 moves upward, the cap may be released therefrom and discharged onto the ejecting means. The head 274 may be moved or struck one or more times in quick succession, as by a suitable cam, or the like, to assure disengagement of the cap.

According to my novel process, the molding material is continuously heated and compressed in successive steps, as distinguished from those cases where the pressure is gradually increased. By reason of such step by step compression, the gases generated from the molding material are given an ample opportunity to escape, and the molding material is maintained relatively at rest during the intervals between the increases of pressure, while the relatively sudden increases of pressure tend to produce a recoordination of the particles of the material so as to obtain an effect similar to that of tamping the material. Such increases in pressure occur at uniform time intervals and preferably in equal amounts, whereby uniformly compact molded articles of a high degree of strength are obtained. As above described, the changes of molding material may be supplied in the form of uniform compressed tablets which may have been heated if desired. Such heating may be only a preliminary operation, and it may drive off a quantity of the volatiles of the material, but is preferably insufficient to affect the subsequent setting or curing of the material which is accomplished in the molding operation. Nevertheless, due to the preliminary heating and compression of the tablets and especially the driving off of a portion of the gases thereof, the final molding operation can be more quickly accomplished and with rapid increases of pressure. Moreover, the tablet may be exposed for a definite time interval in which gases may slowly and freely evolve, especially as the tablet need not have been highly compressed. The tablet may be rapidly fed to the molding dies with very little time interval so that the heat of the material is maintained and to avoid excess cooling such as might effect the subsequent molding or curing of the material. The molding operation itself will occur for a definite period of time, dependent upon the speed of travel of the dies. The latter in turn may be governed by the nature of the material, temperature and degree of compression employed. After the molded article is discharged from the dies, it may be immediately finished, and the finishing operations may occur while the article is still hot and before or after the setting has occurred. It will be understood that the setting of the material occurs generally after the article has cooled. I have generally found it advantageous to perform the finishing operations while the article is still hot, as the material is then comparatively easy to work and smooth even surfaces can be obtained by cutting, grinding or other operations. The above described process may be employed with omission of certain steps thereof or substitution of other steps thereof, or reversal of steps, and under different specific temperature and pressure conditions, for synthetic resinous materials, plastic pulp materials, and other composition materials having water, oil, or other liquid in a natural or combined state.

It will be appreciated that various changes and modifications may be made in the device as shown in the drawings, and that the same is submitted in an illustrative and not in a limiting sense, the scope of the invention being defined in the following claims.

In construing the terms thereof, a screw may be considered equivalent to a cam, a sealing member may be equivalent to a core, and the term cutting may also signify grinding. The clutches may include positive or frictional types.

I claim:

1. A device including a series of traveling dies, each of said dies including a plurality of die members movable as a unit in open and closed positions of said dies, said dies having individual means for maintaining the die members in compressive interengagement, and means stationary relatively to the traveling dies and including individual elements each of which separately actuates the different individual means of a plurality of the dies during the travel thereof.

2. In a molding apparatus, a series of traveling dies comprising each a plurality of compression die members permanently associated as units in open and closed positions of the dies, power means movable with the dies for moving the die members toward and away from each other, and relatively stationary means engaging the power means for successively actuating the said means, said power means being movable into positions out of engagement with the stationary means and being adapted in said positions to maintain the die members in compression or spaced relation to each other.

3. An apparatus for molding plastic compositions including a series of dies having each a plurality of die members, power means adapted for simultaneously individually coacting with the die members for exerting a compressive force therebetween, and a series of successively operating elements each of which successively actuates said power means, one of said series being movable past the other.

4. In combination with an endless series of traveling dies for molding plastic compositions under heat and pressure, of individual power means carried by the dies for compressing and maintaining the same under compression, and a series of relatively stationary devices each being successively intermittently operative with said individual means for applying power thereto for controlling the compression on the dies, the successive devices having different power applying settings for gradually increasing the compression on the dies.

5. An apparatus for molding plastic materials including a series of dies, each of said dies having a plurality of die members maintained in permanent relation with each other as a complete die in open and closed positions of the dies, individual power applying screw means for the dies for moving the die members toward and away from each other for opening the dies and applying variable compressive forces thereto, and a series of elements including clutches movable into and out of engagement with each of the successive individual screw means for actuating the latter, one of said series being intermittently movable past the other.

6. In a molding apparatus having a series of dies traveling in an endless path, individual power applying screw means for each of the dies traveling therewith and adapted to control the movement of the parts of the different dies relative to each other, a relatively stationary power means including a plurality of elements movable in different degrees into and out of engagement with successive individual means and having rotary means for actuating the same in different degrees, and means to cause an intermittent travel of the dies so that the power means actuates a plurality of the said individual means during stationary intervals of the dies.

7. A molding device including a series of dies, each of said dies having a plurality of die members, means for holding the die members in permanent assembly relation as a complete die in open and closed position thereof, said means including individual screws for the dies for creating a compressive force between the die members, a series of elements for turning said screws so that each element is successively operative with said screws, and means for operating said elements for different degrees of motion, one of said series being movable past the other.

8. A molding device including a series of dies, each of said dies having a plurality of die members, means for holding the die members in permanent assembly relation as a complete die in open and closed position thereof, said means including individual screws for the dies for creating a compressive force between the die members, and means for successively actuating said screws, said actuating means being reciprocable parallely to the axis of a screw engaged thereby and having a rotatable member and a nonrotatable member, said members having cam engagement with each other whereby rotation is caused of the rotatable member as a result of reciprocation relative thereto of the nonrotatable member, the rotatable member having means for successively engaging and rotating said screws.

9. A device including a die having a plurality of die members, a screw permanently associated with the die for causing a compressive force between the die members, and reciprocable means for actuating the screw alined therewith, said means including a plurality of interrelatively movable members having cam engagement with each other whereby one of the members is rotatable relative to the other member, the rotatable member having releasable clutch engagement with the screw, and said means and said die being movable relatively to each other at an angle to the axes thereof.

10. A device for molding plastic compositions under heat and pressure, including a female die member, a sealing means therefor, a core movable through the sealing means, means for first moving the sealing member into sealing relation with the female die member and then the core into the latter, said means including a plurality of concentric actuator elements connected to the core and sealing member, the die member, sealing means, core and elements constituting a traveling unit, and power means separately releasably engageable with the different elements.

11. A molding machine including a series of traveling dies having die members maintained in permanent assembly relation as units in open and closed positions of the dies, each die having individual rotary elements for maintaining the same open, closed or under compression, and a series of power members operative with said elements and having relatively stationary positions along the path of travel of the dies, each of said members being reciprocatory for movement into and out of engagement with said elements and being rotary for operating said elements, and means for actuating said power members, said means including a plurality of elements having different settings and being separately associated with the different power members for causing the dies to be successively opened, closed and compressed in course of the travel thereof.

12. A molding machine including a series of traveling dies having die members maintained in permanent assembly relation as units in open and closed positions of the dies, each die having individual rotary elements for maintaining the same open, closed or under compression, and a series of power members operative with said elements and having relatively stationary positions along the path of travel of the dies, each of said members being reciprocatory for movement into and out of engagement with said elements and being rotary for operating said elements, means for actuating said power members, said means including a plurality of elements having different settings and being separately associated with the different power members for causing the dies to be successively opened, closed and compressed in course of the travel thereof, and a unitary drive for causing an intermittent travel of the dies and a synchronous operation of said devices.

13. A molding machine including a series of traveling dies having die members maintained in permanent assembly relation as units in open and closed positions of the dies, each die having individual rotary elements for maintaining the same open, closed or under compression, and a series of power members operative with said elements and having relatively stationary positions along the path of travel of the dies, each of said members being reciprocatory for movement into and out of engagement with said elements and being rotary for operating said elements, and means for actuating said power members, said means including a plurality of elements having different settings and being separately associated with the different power members for causing the dies to be successively opened, closed and compressed in course of the travel thereof, said dies being interconnected to form an endless chain, said power members being disposed along one run of the chain, and the dies being maintained by said elements under uniform compression on the return run of the chain.

JAMES P. BURKE.